US009844841B2

(12) United States Patent
Farah et al.

(10) Patent No.: US 9,844,841 B2
(45) Date of Patent: Dec. 19, 2017

(54) DROP CENTER POSITIONER WITH MULTIPLE ROTATE MODULES

(71) Applicant: Lincoln Global, Inc., City of Industry, CA (US)

(72) Inventors: Jehad N. Farah, Twinsburg, OH (US); David E. Osicki, Leroy Township, OH (US); Jung Hwa Lee, Shaker Heights, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 80 days.

(21) Appl. No.: 14/707,417

(22) Filed: May 8, 2015

(65) Prior Publication Data

US 2016/0325386 A1    Nov. 10, 2016

(51) Int. Cl.
| B23K 37/00 | (2006.01) |
| B25J 9/00 | (2006.01) |
| B23K 37/047 | (2006.01) |
| B25J 11/00 | (2006.01) |
| B25J 9/16 | (2006.01) |

(52) U.S. Cl.
CPC ........... B23K 37/047 (2013.01); B25J 9/0096 (2013.01); B25J 9/1682 (2013.01); B25J 11/005 (2013.01); Y10S 901/02 (2013.01); Y10S 901/42 (2013.01)

(58) Field of Classification Search
None
See application file for complete search history.

(56) References Cited

U.S. PATENT DOCUMENTS

| 2,783,531 | A | * | 3/1957 | Eisler | B23K 37/0461 118/53 |
| 5,802,698 | A | * | 9/1998 | Fitzgerald | B23Q 1/58 269/71 |
| 6,907,318 | B2 | | 6/2005 | Passmore | |
| 8,099,184 | B2 | | 1/2012 | Schoening | |
| 2006/0245901 | A1 | * | 11/2006 | Yamaoka | B23K 37/0443 414/692 |

(Continued)

FOREIGN PATENT DOCUMENTS

| CN | 101941127 A | 1/2011 |
| CN | 202922070 U | 5/2013 |

(Continued)

OTHER PUBLICATIONS

Ardayfio, David, "Fundamentals of Robotics", CRC Press, May 1987, p. 103-104.*

(Continued)

Primary Examiner — Devang R Patel
(74) Attorney, Agent, or Firm — Brad C. Spencer

(57) ABSTRACT

A welding assembly for welding a plurality of workpieces includes a positioner assembly including a base assembly and a workpiece holding assembly that is mounted to the base assembly. The workpiece holding assembly includes a beam having a longitudinal axis and a plurality of holding elements that are each mounted to the beam and adapted for holding and positioning a workpiece for welding. The beam is rotatable about a primary axis that is substantially horizontal. The plurality of holding elements are each rotatable about an auxiliary axis that is transverse to the longitudinal axis of the beam.

14 Claims, 6 Drawing Sheets

(56) References Cited

U.S. PATENT DOCUMENTS

| | | | |
|---|---|---|---|
| 2006/0278622 A1* | 12/2006 | Inoue | B23K 37/0452 219/125.1 |
| 2009/0102109 A1* | 4/2009 | Nuchter | B23Q 3/103 269/71 |
| 2011/0174793 A1 | 7/2011 | Shiraga | |
| 2012/0312862 A1* | 12/2012 | Landoll | B23K 37/0235 228/7 |
| 2014/0015181 A1 | 1/2014 | Murphy | |
| 2014/0015186 A1* | 1/2014 | Wessel | B23Q 1/037 269/97 |

FOREIGN PATENT DOCUMENTS

| | | |
|---|---|---|
| CN | 203091928 U | 7/2013 |
| CN | 203330584 U | 12/2013 |
| JP | 2008-188680 A | 8/2008 |
| JP | 2009-028768 A | 2/2009 |
| JP | 2011-167703 A | 9/2011 |

OTHER PUBLICATIONS

"Robotic Welding Solutions", Yaskawa Motoman Robotics, website can be found at http://www.motoman.com/datasheets/ArcWorld%20and%20FabWorld%20Brochure.pdf, accessed on Dec. 23, 2014.

"Skid Steer Loader Chassis", Yaskawa Motoman Robotis Arc Welding, website can be found at http://www.motoman.com/casestudies/acs-068.php, accessed on Dec. 23, 2014.

"Automated Welding Applications", Yaskawa Motoman, website can be found at http://www.motoman.com/applications/robotic_arc_welding.php, accessed on Dec. 23, 2014.

* cited by examiner

DROP CENTER POSITIONER WITH MULTIPLE ROTATE MODULES

TECHNICAL FIELD

The present disclosure relates to a welding assembly and more particularly, a welding assembly for welding a plurality of workpieces.

BACKGROUND

Welding assemblies can comprise one or more robots that are operable to perform welding operations on a workpiece. The welding assemblies can include a drop center positioner that can be used to hold the workpiece and move the workpiece to a position for one or more robots to perform a welding operation. However, sometimes multiple robots cannot perform their welding operations simultaneously on a single workpiece as their operations can interfere with each other. In such situations, a robot may have to remain idle while other robots are being operated, which is an inefficient non-use of the robot.

SUMMARY

In accordance with a first aspect, a welding assembly for welding a plurality of workpieces comprises a positioner assembly comprising a base assembly and a workpiece holding assembly that is mounted to the base assembly. The workpiece holding assembly comprises a beam having a longitudinal axis and a plurality of holding elements that are each mounted to the beam and adapted for holding and positioning a workpiece for welding. The beam is rotatable about a primary axis that is substantially horizontal. The plurality of holding elements are each rotatable about an auxiliary axis that is transverse to the longitudinal axis of the beam.

In one example of the first aspect, the plurality of holding elements comprises a first holding element that is rotatable about a first auxiliary axis and adapted for holding and positioning a first workpiece for welding. The plurality of holding elements comprises a second holding element that is rotatable about a second auxiliary axis and adapted for holding and positioning a second workpiece for welding. In one example, the welding assembly further comprises a first auxiliary drive mechanism that is selectively operable to rotate the first holding element about the first auxiliary axis and a second auxiliary drive mechanism that is selectively operable to rotate the second holding element about the second auxiliary axis. In another example, the welding assembly further comprises a control system configured to simultaneously operate the first auxiliary drive mechanism with the second auxiliary drive mechanism. In yet another example, the welding assembly further comprises a robot comprising an elongated movable arm and a welding tool coupled to the movable arm. The robot is operable to perform a welding operation on at least one of the first and second workpieces. In still yet another example, the welding assembly further comprises a first robot and a second robot that each comprise an elongated movable arm and a welding tool coupled to the movable arm. The first robot is operable to perform a welding operation on the first workpiece and the second robot is operable to perform a welding operation on the second workpiece. In another example, the welding assembly further comprises a control system configured to simultaneously operate the first robot with the second robot.

In another example of the first aspect, the welding assembly further comprises a drive mechanism that is selectively operable to rotate the beam of the workpiece holding assembly about the primary axis.

In yet another example of the first aspect, the base assembly comprises a first support column and a second support column. The workpiece holding assembly comprises a first support arm coupling a first end of the beam to the first support column and a second support arm coupling a second end of the beam to the second support column. In one example, the workpiece holding assembly comprises a center of gravity and a counterweight that is movably mounted to one of the first and second support arms to control a position of the center of gravity. In another example, the workpiece holding assembly comprises a center of gravity and the beam is adjustably coupled to the first and second support columns with the first and second support arms such that a distance between the primary axis and the longitudinal axis of the beam is adjustable to control a position of the center of gravity.

In still yet another example of the first aspect, the auxiliary axis of each of the plurality of holding elements is substantially perpendicular to the longitudinal axis of the beam.

In still yet another example of the first aspect, the longitudinal axis of the beam is offset from the primary axis such that the longitudinal axis of the beam will rotate about the primary axis as the beam is rotated about the primary axis. In one example, the longitudinal axis of the beam is substantially parallel to the primary axis.

In yet another example of the first aspect, a method of welding a plurality of workpieces using the welding assembly comprises the step of coupling the first workpiece to the first holding element and the second workpiece to the second holding element. The method further comprises the step of simultaneously operating the first auxiliary drive mechanism with the second auxiliary drive mechanism.

In still yet another example of the first aspect, a method of welding a plurality of workpieces using the welding assembly comprises the step of coupling the first workpiece to the first holding element and the second workpiece to the second holding element. The method further comprises the step of simultaneously operating the first robot with the second robot.

The first aspect can be provided alone or in combination with one or any combination of the examples of the embodiment discussed above.

In accordance with a second aspect, a welding assembly for welding a plurality of workpieces comprises a positioner assembly. The positioner assembly comprises a base assembly comprising a first support column and a second support column. The positioner assembly further comprises a workpiece holding assembly that is mounted to the base assembly. The workpiece holding assembly comprises a beam having a longitudinal axis, wherein the beam is rotatable about a primary axis that is substantially horizontal. The workpiece holding assembly further comprises a first support arm rotatably coupling a first end of the beam to the first support column. The workpiece holding assembly further comprises a second support arm rotatably coupling a second end of the beam to the second support column. The workpiece holding assembly further comprises a first holding element mounted to the beam and adapted for holding and positioning a first workpiece for welding. The first holding element is rotatable about a first auxiliary axis that is transverse to the longitudinal axis of the beam. The workpiece holding assembly further comprises a second holding element mounted to the beam and adapted for holding and positioning a second workpiece for welding. The second holding element is rotatable about a second auxiliary axis that is transverse to the longitudinal axis of the beam.

In one example of the second aspect, the welding assembly further comprises a first robot and a second robot that each comprise an elongated movable arm and a welding tool coupled to the movable arm. The first robot is operable to perform a welding operation on the first workpiece and the second robot is operable to perform a welding operation on the second workpiece. In one example, the workpiece holding assembly comprises a center of gravity and a counterweight that is movably mounted to one of the first and second support arms to control a position of the center of gravity.

The second aspect can be provided alone or in combination with one or any combination of the examples of the embodiment discussed above.

In accordance with a third aspect, a welding assembly for welding a plurality of workpieces that comprises a positioner assembly. The positioner assembly comprises a base assembly and a workpiece holding assembly that is mounted to the base assembly. The workpiece holding assembly comprises a beam having a longitudinal axis, wherein the beam is rotatable about a primary axis that is substantially horizontal. The workpiece holding assembly further comprises a first holding element mounted to the beam and adapted for holding and positioning a first workpiece for welding. The first holding element is rotatable about a first auxiliary axis that is transverse to the longitudinal axis of the beam. The workpiece holding assembly further comprises a second holding element mounted to the beam and adapted for holding and positioning a second workpiece for welding. The second holding element is rotatable about a second auxiliary axis that is transverse to the longitudinal axis of the beam.

DETAILED DESCRIPTION OF THE DRAWINGS

Embodiments of the invention are better understood when the following detailed description is read with reference to the accompanying drawings, in which.

DETAILED DESCRIPTION

Figure 1:
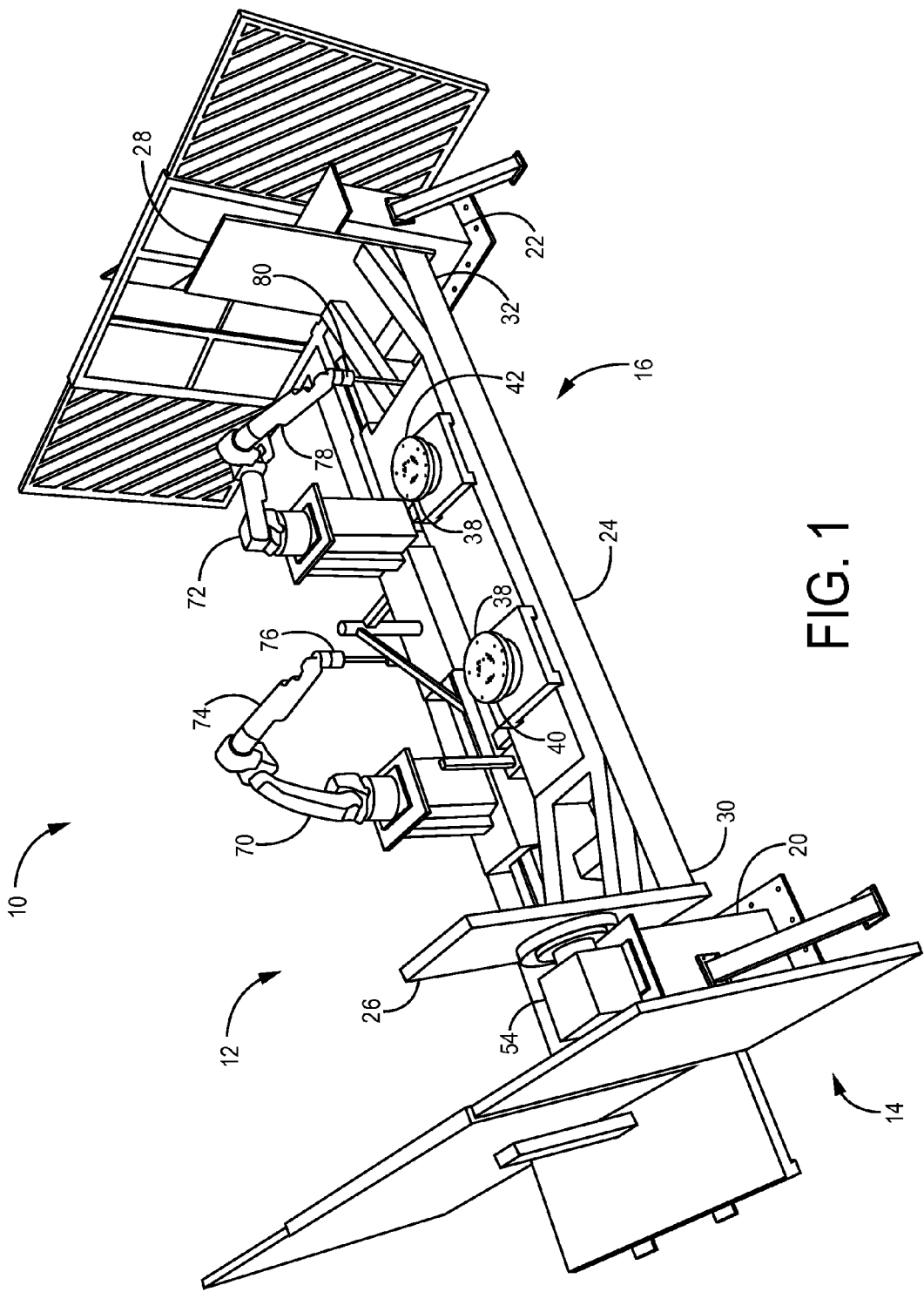
FIG. 1 is a perspective view of an example welding assembly.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is to be noted that the phrases "substantially parallel" and "substantially perpendicular" as used herein when describing the relative orientation of two or more axes respectively mean that the axes are within 10 degrees or less of parallel and perpendicular, and more preferably, within 5 degrees or less of parallel and perpendicular when viewed along a particular plane. Moreover, the phrases "substantially parallel" and "substantially perpendicular" as used herein when describing the relative orientation of two or more axes do not mean that the axes must intersect as the axes may, for example, be provided in different planes.

It is to be noted that the term "transverse" as used herein when describing the relative orientation of two or more axes means that the axes are non-parallel when viewed along a particular plane. Moreover, the term "transverse" as used herein when describing the relative orientation of two or more axes does not mean that the axes must intersect as the axes may, for example, be provided in different planes.

It is to be noted that the term "coupled" as used herein when describing two or more features means that the features can be integral with each other or that the features can be separate features that are removably or non-removably attached to each other using various means such as threads, fasteners, hooks, clips, adhesive, welds, or other means of attaching two separate features.

Figure 2:
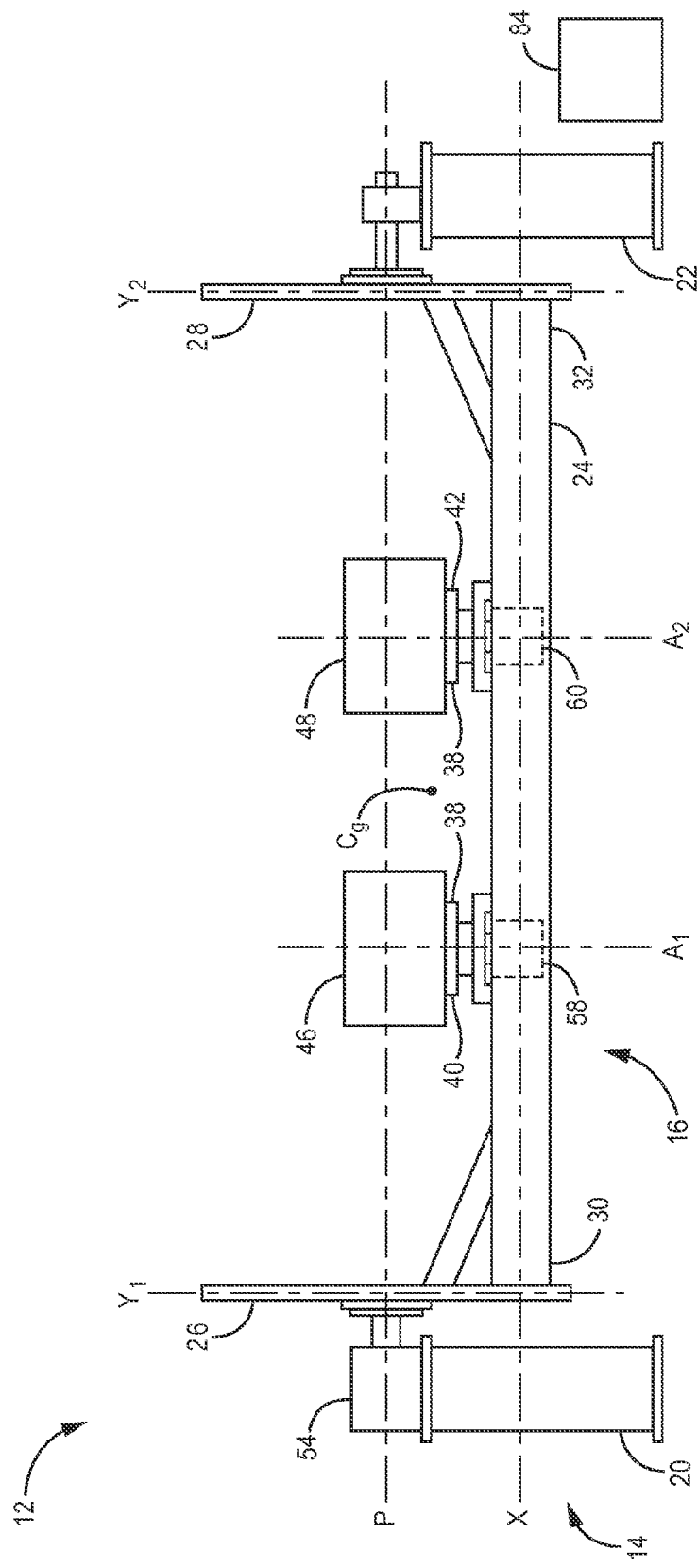
FIG. 2 is a front view of a positioner assembly of the example welding assembly.

Referring now to FIGS. 1 & 2, an example welding assembly 10 is shown for welding a plurality of workpieces. The welding assembly 10 can comprise a positioner assembly 12 for positioning the workpieces that comprises a base assembly 14 and a workpiece holding assembly 16 that is rotatably mounted to the base assembly 14.

The base assembly 14 can comprise a first support column 20 and a second support column 22. Moreover, the workpiece holding assembly 16 can comprise a beam 24 having a longitudinal axis X that is rotatably mounted to the first and second support columns 20, 22 of the base assembly 14 such that the beam 24 is rotatable about a substantially horizontal, primary axis P. More specifically, the workpiece holding assembly 16 can comprise first and second support arms 26, 28 that respectively couple first and second ends 30, 32 of the beam 24 to the first and second support columns 20, 22. The first and second support arms 26, 28 can respectively comprise longitudinal axes $Y_1$, $Y_2$ that are transverse to the primary axis P. Preferably, the longitudinal axes $Y_1$, $Y_2$ are substantially perpendicular to the primary axis P and the longitudinal axis X of the beam 24, as shown in FIG. 2, though other angles are possible. The first and second support arms 26, 28 can be rotatably coupled to the first and second support columns 20, 22 such that the first and second support arms 26, 28 and their respective longitudinal axes $Y_1$, $Y_2$ are rotatable about the primary axis P. As the first and second support arms 26, 28 are rotated about the primary axis P, the beam 24 coupled thereto will likewise be rotated about the primary axis P.

In some examples, the beam 24 can be coupled to the first and second support arms 26, 28 at a location away from the primary axis P such that the longitudinal axis X of the beam 24 is offset from and substantially parallel to the primary axis P, as shown in FIG. 2, though other non-parallel arrangements are possible. When coupled as such, the longitudinal axis X of the beam 24 will rotate about the primary axis P as the beam 24 is rotated about the primary axis P. In other examples, the beam 24 can be coupled to the first and second support arms 26, 28 such that the longitudinal axis X of the beam 24 is coaxial with the primary axis. When coupled as such, the longitudinal axis X of the beam 24 can remain coaxial with the primary axis P as the beam 24 is rotated about the primary axis P.

In some embodiments, the workpiece holding assembly 16 can further comprise a plurality of holding elements 38 that are each mounted to the beam 24 and adapted for holding and positioning a workpiece for welding. The plurality of holding elements 38 can each be rotatable about an auxiliary axis that is transverse to the longitudinal axis X of the beam 24. Moreover, the auxiliary axis of each of the plurality of holding elements 38 can be fixed relative to the beam 24 such that the auxiliary axis will rotate about the primary axis P as the beam 24 is rotated about the primary axis P. For example, the plurality of holding elements 38 can comprise a first holding element 40 and a second holding element 42, though in some examples the plurality of holding elements 38 can comprise more than two holding elements. The first holding element 40 can be rotatable about a first auxiliary axis $A_1$ and adapted for holding and positioning a first workpiece 46 for welding. Meanwhile, the second holding element 42 can be rotatable about a second auxiliary axis $A_2$ and adapted for holding and positioning a second workpiece 48 for welding. Preferably, the first and second auxiliary axes $A_1$, $A_2$ are both substantially perpendicular to and intersect with the primary axis P and the longitudinal axis X of the beam 24 (as shown in FIG. 2), though other non-perpendicular or non-intersecting configurations are possible. Moreover, the first and second auxiliary axes $A_1$, $A_2$ can both be fixed relative to the beam 24 such that the first and second auxiliary axes $A_1$, $A_2$ will rotate about the primary axis P as the beam 24 is rotated about the primary axis P.

The plurality of holding elements 38 can each comprise various structure for coupling workpieces thereto and holding the workpieces for welding. For example, the first and second holding elements 40, 42 can comprise through-holes that bolts can extend through to bolt the first and second workpieces 46, 48 respectively thereto. In some examples, the through-holes can be threaded and the bolts can threadably engage the through-holes to threadably secure the first and second workpieces 46, 48 to the first and second holding elements 40, 42. In other examples, the first and second holding elements 40, 42 can comprise clamps that can be used to clamp workpieces thereto. Still in other examples, the first and second holding elements 40, 42 can comprise a guide channel or groove that workpieces can slidably engage to couple the workpieces thereto and hold them in place. The plurality of holding elements 38 can each comprise any structure known in the art for coupling workpieces thereto and holding the workpieces for welding without departing from the scope of the invention.

The plurality of holding elements 38 can be adapted for holding workpieces that are similar to each other in configuration or workpieces that have different configurations. For instance, the first and second workpieces 46, 48 held by the first and second holding elements 40, 42 can be workpieces in a product assembly process that are at a similar stage in the product assembly process and thus have similar configurations. Alternatively, the first and second workpieces 46, 48 can be workpieces that are at a different stage in the product assembly process and thus have different configurations. Indeed, the first and second workpieces 46, 48 can be completely different workpieces for completely different product assembly processes.

When one or more workpieces are coupled to the plurality of holding elements 38 of the positioner assembly 12, each workpiece can be rotated about the primary axis P by rotating the beam 24. Moreover, each workpiece can further be rotated about the auxiliary axis of its corresponding holding element 38 by rotating the holding element 38. Accordingly, the positioner assembly 12 can provide a variety of different orientations for each workpiece by rotating the beam 24 and/or the corresponding holding element 38 of the workpiece. In particular, when the positioner assembly 12 is configured such that the longitudinal axis X of the beam 24 is offset from the primary axis P, the position assembly 12 will function as a drop center positioner since the longitudinal axis X of the beam 24 will be dropped from the centerline of rotation when the beam 24 is rotated to its lowest position (as shown in FIG. 2).

In some embodiments, the welding assembly 10 can comprise one or more drive mechanisms that are selectively operable to drive components of the positioner assembly 12 and thereby adjust a position of any workpieces being held by the workpiece holding assembly 16. For example, the welding assembly 10 can comprise a primary drive mechanism 54 that is selectively operable to rotate the beam 24 of the workpiece holding assembly 16 about the primary axis P. The primary drive mechanism 54 can be part of the first support column 20 and can comprise a motor and appropriate gearing that engages the first support arm 26 and is automatically operable to rotate the first support arm 26 and coupled beam 24, as shown in FIGS. 1 & 2. However, in other examples, the primary drive mechanism 54 can be part of the second support column 22 and can comprise a motor that engages the second support arm 28 and is automatically operable to rotate the second support arm 28 and coupled beam 24. Still in other examples, the primary drive mechanism 54 can comprise a lever that is manually operable or some other mechanism that is either manually or automatically operable to rotate the beam 24. Moreover, the primary drive mechanism 54 can be a separate component from the first and second support columns 20, 22.

In some examples, the welding assembly 10 can comprise a plurality of auxiliary drive mechanisms that are selectively operable to rotate corresponding holding elements 38 about their respective auxiliary axes. For example, the positioner assembly 12 can comprise a first auxiliary drive mechanism 58 that is selectively operable to rotate the first holding element 40 about the first auxiliary axis $A_1$ and a second auxiliary drive mechanism 60 that is selectively operable to rotate the second holding element 42 about the second auxiliary axis $A_2$. The first auxiliary drive mechanism 58 can comprise a motor that engages the first holding element 40 and is automatically operable to rotate the first holding element 40. Similarly, the second auxiliary drive mechanism 60 can comprise a motor that engages the second holding element 42 and is automatically operable to rotate the second holding element 42. However, in other examples, either one of the first and second auxiliary drive mechanisms 58, 60 can comprise some other mechanism that is either manually or automatically operable to rotate its corresponding holding element 38.

Depending on the mass and arrangement of components of the workpiece holding assembly 16, rotation of the beam 24 about the primary axis P can produce torsional forces in components of the welding assembly 10 such as, for example, the primary drive mechanism 54 that is driving or holding the beam 24 in place. For instance, the workpiece holding assembly 16 will comprise a center of gravity $C_g$, the location of which will be a function of the mass and arrangement of the components of the workpiece holding assembly 16 such as, for example, the beam 24, the first and second support arms 26, 28, the plurality of holding elements 38, and any workpieces coupled thereto. If the center of gravity $C_g$ is not located on the primary axis P (as shown in FIG. 2), then the weight of the workpiece holding assembly 16 will produce a torque about the primary axis P as the beam 24 is being rotated about the primary axis P. If the weight of the workpiece holding assembly 16 and distance of the center of gravity $C_g$ from the primary axis P is significant enough, the resultant torque could be damaging to components such as the primary drive mechanism 54.

Figure 3:
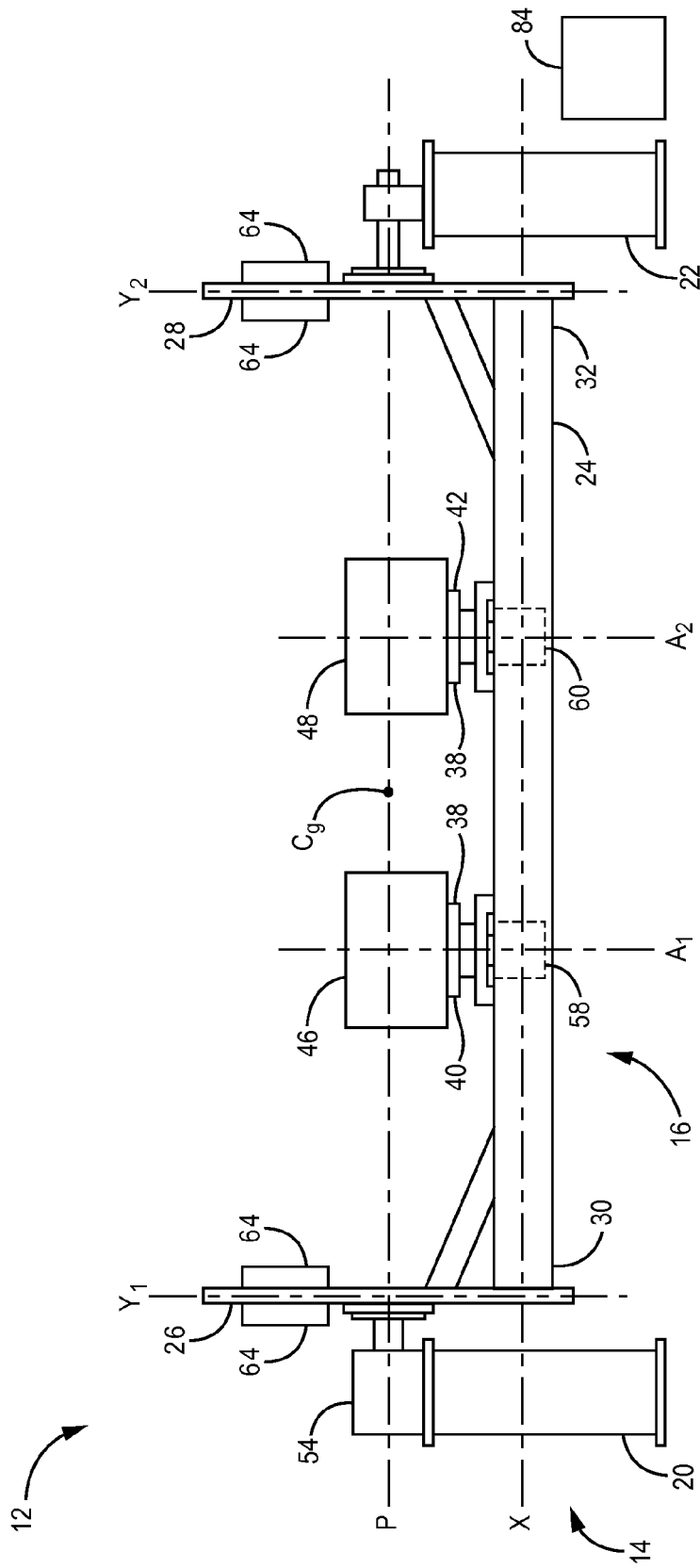
FIG. 3 is a front view of the positioner assembly with counterweights.

To help protect the welding assembly components from damage due to torsional forces produced by rotation of the workpiece holding assembly 16 about the primary axis P, the workpiece holding assembly 16 can comprise a variety of features to help control the location of its center of gravity $C_g$ so as to minimize a distance between the center of gravity $C_g$ and the primary axis P and thereby minimize the production of torsional forces applied to components about the primary axis P as the beam 24 is being rotated. The location will preferably be controlled such that the center of gravity $C_g$ is located on the primary axis P. For example, in some embodiments, the workpiece holding assembly 16 can comprise one or more counterweights 64 that can be movably mounted to its components to control the position of its center of gravity $C_g$, as shown in FIG. 3. The counterweights 64 can be movably mounted to one or both of the first and second support arms 26, 28 to adjust the weight distribution of the workpiece holding assembly 16 and thereby move the center of gravity $C_g$ to a location either on or close to the primary axis P. As workpieces are added to or removed from the workpiece holding assembly 16, counterweights 64 can be added or removed to compensate for the change in weight distribution and help maintain the center of gravity $C_g$ on or close to the primary axis P. In addition or alternatively, as workpieces are added to or removed from the workpiece holding assembly 16, the mounting location of the counterweights 64 along the first and second support arms 26, 28 can be adjusted to similarly compensate for the change in weight distribution and help maintain the center of gravity $C_g$ on or close to the primary axis P.

Figure 4:
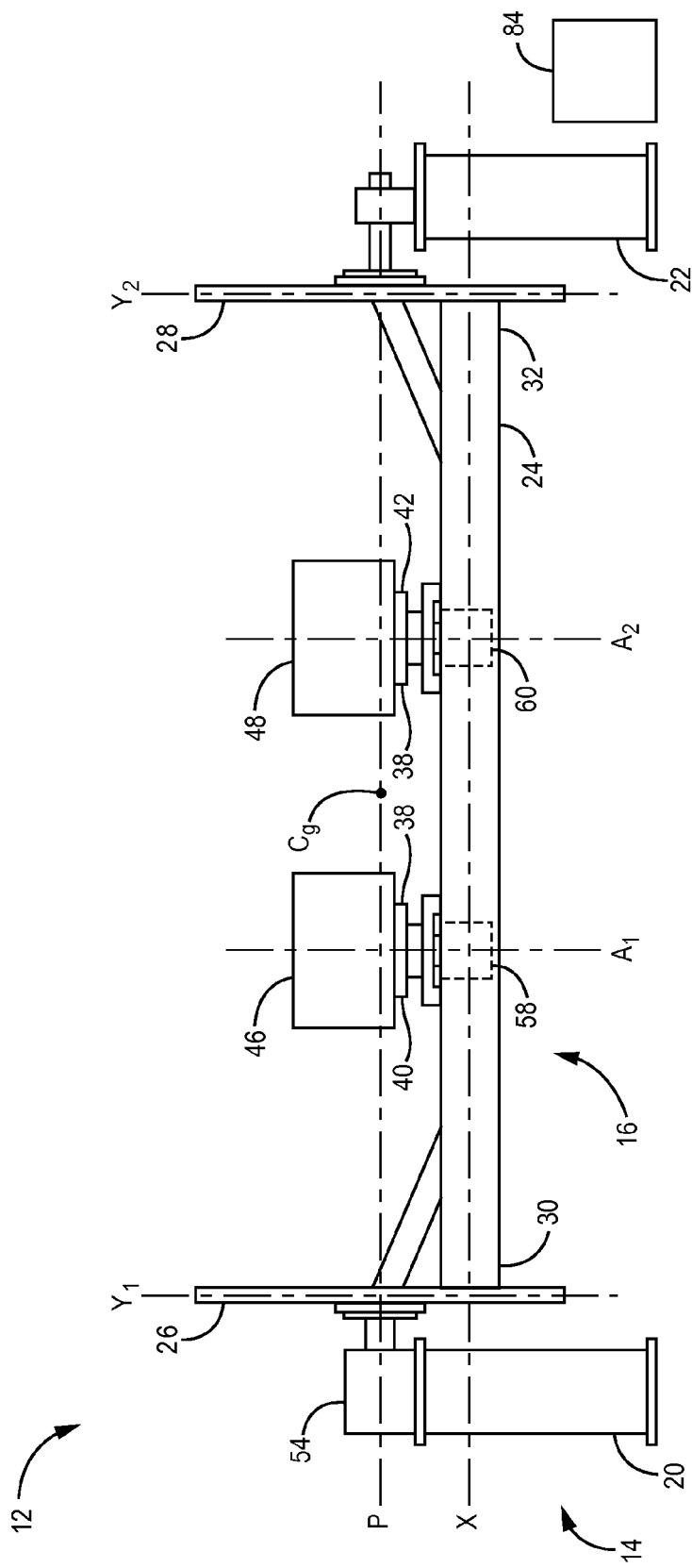
FIG. 4 is a front view of the positioner assembly with an adjusted coupling between a beam and first and second side arms of the positioner assembly.

As another example, in some embodiments, the beam 24 can be adjustably coupled to the first and second support columns 20, 22 with the first and second support arms 26, 28 such that a distance between the primary axis P and the longitudinal axis X of the beam 24 is adjustable to control the position of the center of gravity $C_g$. For example, in one embodiment, the coupling location of the beam 24 to the first and second support arms 26, 28 can be adjustable so to permit reposition the longitudinal axis X of the beam 24 closer to the primary axis P and thereby move the center of gravity $C_g$ to a location either on or close to the primary axis P, as shown in FIG. 4. As workpieces are added to or removed from the workpiece holding assembly 16, the coupling location of the beam 24 to the first and second support arms 26, 28 can again be adjusted to compensate for the change in weight distribution and help maintain the center of gravity $C_g$ on or close to the primary axis P. A variety of different means can be utilized to adjust the coupling location of the beam 24 to the first and second support arms 26, 28. For instance, the first and second support arms 26, 28 can comprise multiple attachment points in the form of through-holes, mounting grooves, mounting projections or other means that can permit removable attachment of the beam 24 to various locations on the first and second support arms 26.

Figure 5:
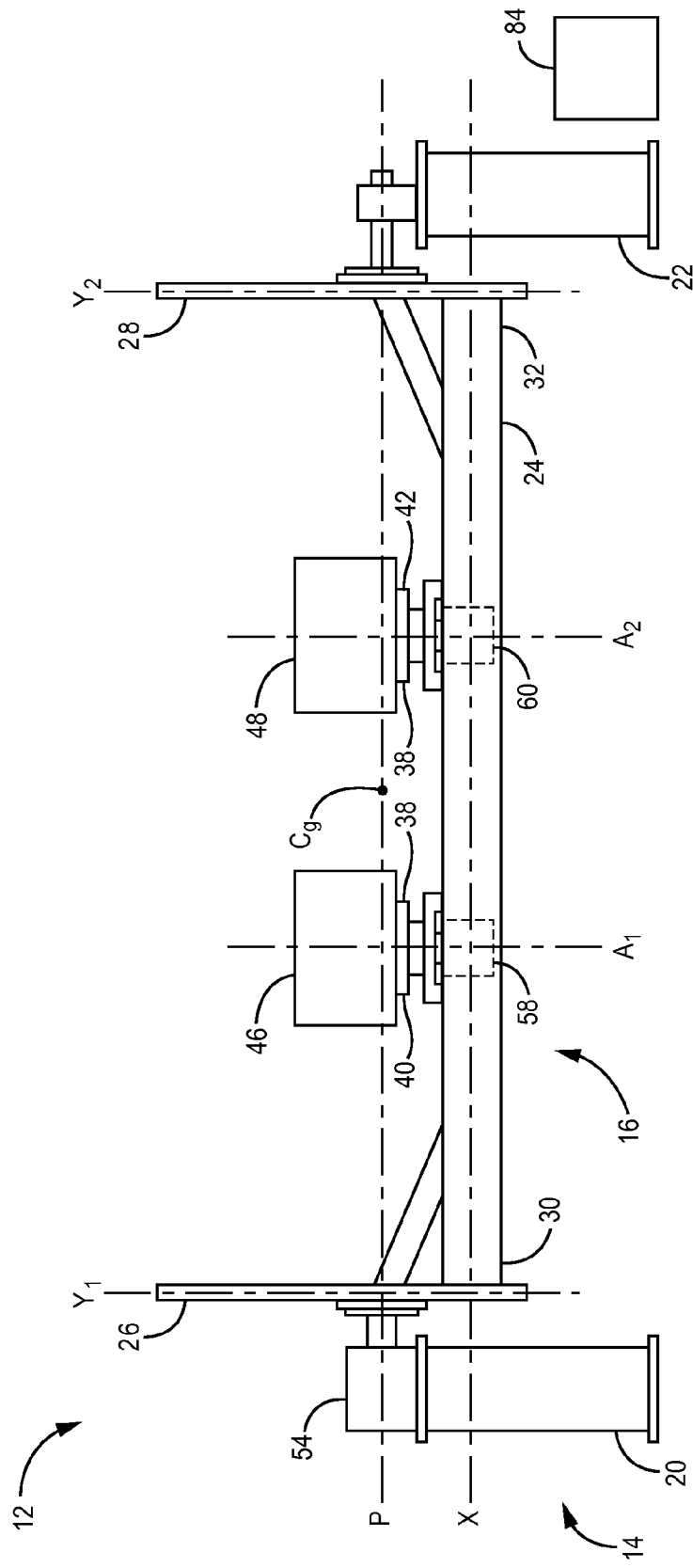
FIG. 5 is a front view of the positioner assembly with an adjusted coupling between the first and second side arms and first and second side columns of the positioner assembly.

In a different embodiment, as shown in FIG. 5, the coupling location of the first and second support columns 20, 22 to the first and second support arms 26, 28 can be adjustable so to permit reposition of the longitudinal axis X of the beam 24 closer to the primary axis P and thereby move the center of gravity $C_g$ to a location either on or close to the primary axis P. As workpieces are added to or removed from the workpiece holding assembly 16, the coupling location of the first and second support columns 20, 22 to the first and second support arms 26, 28 can again be adjusted to compensate for the change in weight distribution and help maintain the center of gravity $C_g$ on or close to the primary axis P. A variety of different means can be utilized to adjust the coupling location of the first and second support columns 20, 22 to the first and second support arms 26, 28. For instance, the first and second support arms 26, 28 can comprise multiple attachment points in the form of through-holes, mounting grooves, mounting projections or other means that can permit removable attachment of the first and second support columns 20, 22 to various locations on the first and second support arms 26, 28.

Referring back now to FIG. 1, in some embodiments, the welding assembly 10 can comprise one or more robots that are each operable to perform a welding operation on one or more workpieces. For example, the welding assembly 10 can comprise a first robot 70 and a second robot 72, though in some examples the welding assembly 10 can comprise more than two robots. The first robot 70 can comprise an elongated movable arm 74 and a welding tool 76 (e.g., an arc welding tool) coupled to the movable arm 74. Moreover, the first robot 70 can be operable to perform a welding operation on at least one of the first and second workpieces 46, 48 when coupled to their corresponding holding element 38. For example, the first robot 70 can be operable to perform a welding operation (e.g., electric arc welding) on the first workpiece 46 with the welding tool 76 when the first workpiece 46 is coupled to the first holding element 40. Similarly, the second robot 72 can comprise an elongated movable arm 78 and a welding tool 80 coupled to the movable arm 78. The second robot 72 can likewise be operable to perform a welding operation on at least one of the first and second workpieces 46, 48 when coupled to their corresponding holding element 38. For example, the second robot 72 can be operable to perform a welding operation on the second workpiece 48 with the welding tool 80 when the second workpiece 48 is coupled to the second holding element 42. In some embodiments, the first robot 70 and/or second robot 72 can be operable to perform welding operations on both of the first and second workpieces 46, 48 when coupled to their corresponding holding element 38.

The welding operation performed by either of the first and second robots 70, 72 can be a MIG welding (GMAW), TIG welding (GTAW), submerged arc welding (SAW), or any other type of welding operation. Moreover, the welding operation performed by the first robot 70 can be similar to the welding operation performed by the second robot 72 or the welding operations performed by the first and second robots 70, 72 can be different from each other in terms of, for example, the type of welding being performed or how a type of welding is being applied.

In some examples, the welding assembly 10 can comprise a control system 84 configured to control one or more components of the welding assembly 10, as schematically shown in FIG. 2. For example, the control system 84 can be configured to automatically control one or more of the primary drive mechanism 54, the first auxiliary drive mechanism 58, the second auxiliary drive mechanism 60, the first robot 70 and the second robot 72. Moreover, the control system 84 can be configured to automatically control multiple components either simultaneously or independent of each other. For example, the control system 84 can be configured to independently control the first and second auxiliary drive mechanisms 58, 60 and/or the first and second robots 70, 72 based on the presence of one or more workpieces coupled to the holding elements 38. For instance, if the first workpiece 46 is coupled to the first holding element 40 and the second workpiece 48 is not coupled to the second holding element 42, the control system 84 can be configured to operate the first auxiliary drive mechanism 58 and/or the first robot 70 while the second auxiliary drive mechanism 60 and the second robot 72 remain idle. Likewise, if the second workpiece 48 is coupled to the second holding element 42 and the first workpiece 46 is not coupled to the first holding element 40, the control system 84 can be configured to operate the second auxiliary drive mechanism 60 and/or the second robot 72 while the first auxiliary drive mechanism 58 and the first robot 70 remain idle. However, if both the first and second workpieces 46, 48 are coupled to the first and second holding elements 40, 42, the control system 84 can be configured to simultaneously operate the first auxiliary drive mechanism 58 and/or the first robot 70 with the second auxiliary drive mechanism 60 and/or the second robot 72.

The welding assembly 10 described above can help reduce the idle time of robots in multi-robot systems. More specifically, because the welding assembly 10 is capable of holding multiple workpieces with its plurality of holding elements 38, multiple robots can simultaneously perform welding operations on separate workpieces coupled to the holding elements 38 as opposed to a single workpiece holding welding assembly wherein a robot may have to be idle while another robot works on the single workpiece.

Figure 6:
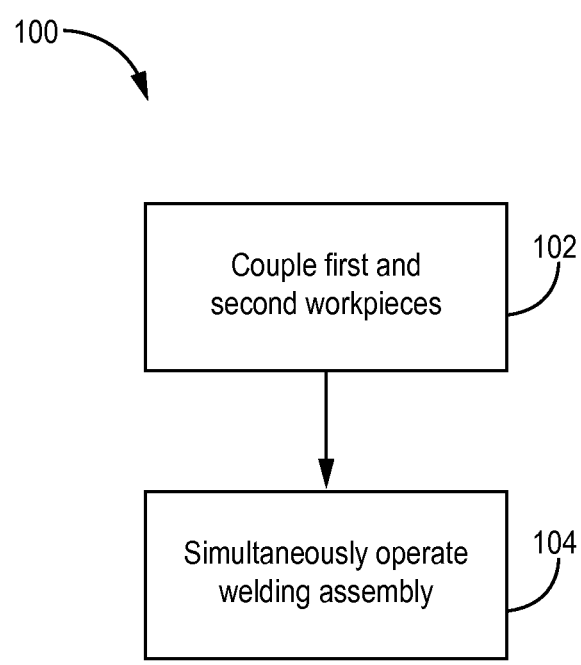
FIG. 6 is a flow chart illustrating steps of a method of welding multiple workpieces with the example welding assembly.

Turning now to FIG. 6, a method 100 will now be described of welding a plurality of workpieces using the welding assembly 10 described above. The method 100 can comprise the step 102 of coupling the first workpiece 46 to the first holding element 40 and coupling the second workpiece 48 to the second holding element 42. The method 100 can further comprise the step 104 of simultaneously operating the first auxiliary drive mechanism 58 and/or the first robot 70 with the second auxiliary drive mechanism 60 and/or the second robot 72. For instance, the control system 84 can be used to simultaneously operate the first drive mechanism 58 with the second drive mechanism 60 and/or the first robot 70 with the second robot 72.

A number of examples have been described above. Nevertheless, it will be understood that various modifications may be made. For example, suitable results may be achieved if the described elements are combined in a different manner and/or replaced or supplemented by other elements or their equivalents.

What is claimed is:

1. A welding assembly for welding a plurality of workpieces comprising:
   a positioner assembly comprising:
      a base assembly; and
      a workpiece holding assembly that is mounted to the base assembly, the workpiece holding assembly comprising a beam having a longitudinal axis and a plurality of holding elements that are each mounted to the beam and adapted for holding and positioning respective workpieces for welding,
   wherein the beam is rotatable about a primary axis that is substantially horizontal, and
   wherein the plurality of holding elements are each rotatable about respective auxiliary axes that are transverse to the longitudinal axis of the beam,
   wherein the base assembly comprises a first support column and a second support column, further wherein the workpiece holding assembly comprises a first support arm coupling a first end of the beam to the first support column and a second support arm coupling a second end of the beam to the second support column, and the workpiece holding assembly having a center of gravity and comprising a counterweight that is movably mounted to one of the first and second support arms to control a position of the center of gravity between the workpieces and between said auxiliary axes that are transverse to the longitudinal axis of the beam,
   wherein the longitudinal axis of the beam is offset from and substantially parallel to the primary axis such that the longitudinal axis of the beam will rotate about the primary axis as the beam is rotated about the primary axis.

2. The welding assembly of claim 1, wherein the plurality of holding elements comprises a first holding element that is rotatable about a first auxiliary axis and adapted for holding and positioning a first workpiece for welding, further wherein the plurality of holding elements comprises a second holding element that is rotatable about a second auxiliary axis and adapted for holding and positioning a second workpiece for welding.

3. The welding assembly of claim 2, further comprising a first auxiliary drive mechanism that is selectively operable to rotate the first holding element about the first auxiliary axis and a second auxiliary drive mechanism that is selectively operable to rotate the second holding element about the second auxiliary axis.

4. The welding assembly of claim 3, further comprising a control system configured to simultaneously operate the first auxiliary drive mechanism with the second auxiliary drive mechanism.

5. The welding assembly of claim 2, further comprising a robot comprising an elongated movable arm and a welding tool coupled to the movable arm, wherein the robot is operable to perform a welding operation on at least one of the first and second workpieces.

6. The welding assembly of claim 2, further comprising a first robot and a second robot that each comprise an elongated movable arm and a welding tool coupled to the movable arm, wherein the first robot is operable to perform a welding operation on the first workpiece and the second robot is operable to perform a welding operation on the second workpiece.

7. The welding assembly of claim 6, further comprising a control system configured to simultaneously operate the first robot with the second robot.

8. The welding assembly of claim 1, further comprising a drive mechanism that is selectively operable to rotate the beam of the workpiece holding assembly about the primary axis.

9. A welding assembly for welding a plurality of workpieces comprising:
   a positioner assembly comprising:
      a base assembly; and
      a workpiece holding assembly that is mounted to the base assembly, the workpiece holding assembly comprising a beam having a longitudinal axis and a plurality of holding elements that are each mounted to the beam and adapted for holding and positioning respective workpieces for welding,
   wherein the beam is rotatable about a primary axis that is substantially horizontal, and wherein the plurality of holding elements are each rotatable about respective auxiliary axes that are transverse to the longitudinal axis of the beam, wherein the base assembly comprises a first support column and a second support column, further wherein the workpiece holding assembly comprises a first support arm coupling a first end of the beam to the first support column and a second support arm coupling a second end of the beam to the second support column, and wherein the workpiece holding assembly comprises a center of gravity and the beam is adjustably and removably coupled to the first and second support columns with the first and second support arms such that a distance between the primary axis and the longitudinal axis of the beam is adjustable to control a position of the center of gravity between the workpieces and between said auxiliary axes that are transverse to the longitudinal axis of the beam, wherein the longitudinal axis of the beam is offset from and substantially parallel to the primary axis such that the longitudinal axis of the beam will rotate about the primary axis as the beam is rotated about the primary axis.

10. The welding assembly of claim 1, wherein the respective auxiliary axis of each of the plurality of holding elements is substantially perpendicular to the longitudinal axis of the beam.

11. A method of welding a plurality of workpieces using the welding assembly according to claim 3, the method comprising the steps of:
coupling the first workpiece to the first holding element and the second workpiece to the second holding element; and
simultaneously operating the first auxiliary drive mechanism with the second auxiliary drive mechanism.

12. A method of welding a plurality of workpieces using the welding assembly according to claim 6, the method comprising the steps of:
coupling the first workpiece to the first holding element and the second workpiece to the second holding element; and
simultaneously operating the first robot with the second robot.

13. A welding assembly for welding a plurality of workpieces comprising:
a positioner assembly comprising:
a base assembly comprising a first support column and a second support column; and
a workpiece holding assembly that is mounted to the base assembly, the workpiece holding assembly comprising:
a beam having a longitudinal axis, wherein the beam is rotatable about a primary axis that is substantially horizontal,
a first support arm rotatably coupling a first end of the beam to the first support column,
a second support arm rotatably coupling a second end of the beam to the second support column,
a first holding element mounted to the beam and adapted for holding and positioning a first workpiece for welding, wherein the first holding element is rotatable about a first auxiliary axis that is transverse to the longitudinal axis of the beam,
a second holding element mounted to the beam and adapted for holding and positioning a second workpiece for welding, wherein the second holding element is rotatable about a second auxiliary axis that is transverse to the longitudinal axis of the beam, and
means for vertically adjusting a position of a center of gravity of the workpiece holding assembly between the first and second workpiece and between the first and second auxiliary axes that are transverse to the longitudinal axis of the beam,
wherein the longitudinal axis of the beam is offset from and substantially parallel to the primary axis such that the longitudinal axis of the beam will rotate about the primary axis as the beam is rotated about the primary axis.

14. The welding assembly of claim 13, further comprising a first robot and a second robot that each comprise an elongated movable arm and a welding tool coupled to the movable arm, wherein the first robot is operable to perform a welding operation on the first workpiece and the second robot is operable to perform a welding operation on the second workpiece.

* * * * *